(12) United States Patent
Moretto

(10) Patent No.: US 7,503,128 B2
(45) Date of Patent: Mar. 17, 2009

(54) HOPPER FOR DEHUMIDIFYING LOOSE PARTICULATE MATERIAL

(75) Inventor: Renato Moretto, Massanzago (IT)

(73) Assignee: Moretto S.p.A., Massanzago (IT)

( * ) Notice: Subject to any disclaimer, the term of this patent is extended or adjusted under 35 U.S.C. 154(b) by 279 days.

(21) Appl. No.: 11/246,109

(22) Filed: Oct. 11, 2005

(65) Prior Publication Data

US 2006/0080859 A1 Apr. 20, 2006

(30) Foreign Application Priority Data

Oct. 18, 2004 (IT) .......................... PD2004A0258

(51) Int. Cl.
*F26B 5/00* (2006.01)
(52) U.S. Cl. .................. 34/472; 34/417; 34/82
(58) Field of Classification Search .................. 34/417, 34/443, 467, 762, 79, 82, 85, 80, 168, 169, 34/472; 209/243, 244
See application file for complete search history.

(56) References Cited

U.S. PATENT DOCUMENTS

| 3,135,588 | A | | 6/1964 | Helming | |
|---|---|---|---|---|---|
| 3,440,733 | A | | 4/1969 | Reuter et al. | |
| 3,596,368 | A | | 8/1971 | Zdenek et al. | |
| 3,648,381 | A | * | 3/1972 | Fox | 34/82 |
| 4,390,354 | A | | 6/1983 | Witchell | |
| 4,570,360 | A | * | 2/1986 | Nakagomi | 34/80 |
| 5,509,216 | A | * | 4/1996 | Becker et al. | 34/219 |

FOREIGN PATENT DOCUMENTS

| DE | 415 364 C | 6/1925 |
|---|---|---|
| DE | 423 469 C | 1/1926 |
| DE | 87 07 216 U1 | 6/1988 |
| DE | 197 29 373 C1 | 12/1998 |
| DE | 101 25 732 A1 | 12/2002 |
| EP | 0 416 475 A2 | 3/1991 |
| GB | 1 212 074 A | 11/1970 |
| GB | 2 142 254 A | 1/1985 |
| WO | WO 80/01315 A | 6/1980 |

* cited by examiner

*Primary Examiner*—Kenneth B Rinehart
(74) *Attorney, Agent, or Firm*—Modiano & Associati; Albert Josif; Daniel J. O'Byrne

(57) ABSTRACT

A hopper for dehumidifying loose particulate material, of the type constituted by a container for the particulate material, which is provided, in an upper region, with a covering provided with a manifold for loading the hopper; an air dehumidification device being functionally connected to the hopper; an area for venting the air that is present in the container being provided on the covering and being functionally associable with the intake of the air dehumidification device. The hopper further comprises air filtering elements which are arranged substantially at the venting area.

18 Claims, 5 Drawing Sheets

HOPPER FOR DEHUMIDIFYING LOOSE PARTICULATE MATERIAL

The present invention relates to a hopper for dehumidifying loose particulate material, particularly but not exclusively useful for granules of plastic material.

BACKGROUND OF THE INVENTION

As is known, in the field of the processing of plastic materials of the hygroscopic type (i.e., capable of absorbing moisture internally), one very important step is the process for dehumidifying the granules of plastic material before processing them.

It is necessary to eliminate the moisture from the granules because during the melting facilitated by the high temperature the water enters the molecular chain of the polymer, breaking it and thus reducing mechanical performance.

At the same time, bubbles, blowholes and surface defects are generated in the melted matrix.

Various dehumidification processes for granules of plastic materials are known; among them, the most widely used one is based on the drying of granules by means of a stream of dry air, which removes the water therefrom.

The dehumidification system is constituted typically by a dehumidification device, commonly known as dryer, from which a delivery duct extends which is inserted within a hopper for containing the mass of granules of plastic material.

A duct for venting the air injected by the dryer extends from the covering of the hopper. This venting duct is connected to the intake of the dryer, and a filter is arranged along the venting duct.

The hopper is constituted by a container for containing granules of plastic material and is provided, in an upper region, with a covering provided with a frustum-shaped manifold for loading the hopper.

The outlet of the delivery duct is provided on the bottom region of the container.

The dryer is provided with an internal apparatus which dehumidifies the air, heats it and pumps it into the lower conical part of the hopper, striking the material contained therein.

The air flows upward through the entire hopper until it gathers at the top of the hopper in order to be collected by a volute formed by the covering and by the sides of the manifold and is then conveyed into the venting duct.

The air that reenters the dryer is the vented air, because the recycled air has a lower moisture content than the ambient air and therefore it is more convenient to recycle it.

The filter is intended to purify the air that leaves the hopper from the dust which is always contained in the materials being dried, preventing the dust from then ending in the circuits of the dryer and damaging it.

The risk of damage is so high that for safety reasons a filter is also usually installed inside the dryer, so as to minimize the possibility of dirtying and damage.

Therefore, at least two filters are installed in every system: one on the venting duct of the hopper, which returns to the dryer, and one inside the dryer.

The filters arranged downstream of the hopper are constituted generally by a shell which can be opened and by a cartridge made of filtering material; the assembly forms an element which is physically distinct from the hopper, to which it is fixed externally.

Therefore, the filter is an element of the system which is installed externally with respect to the hopper and is connected to the ducts during the assembly of the system.

This operation entails costs due to the purchase of the filter, to assembly, and to an increase in the circuit complexity of the system and in heat loss.

Problems of this type occur also in similar dehumidification systems used for other types of particulate material.

SUMMARY OF THE INVENTION

The aim of the present invention is to solve the problems noted in known types of system for dehumidifying particulate material.

Within this aim, an object of the present invention is to provide a hopper for dehumidifying loose particulate material, particularly but not exclusively useful for granules of plastic material, which simplifies the dehumidification system in which it is inserted.

Another object of the present invention is to provide a hopper for dehumidifying loose particulate material which allows to reduce the amount of dust which leaves through the venting duct.

Another object of the present invention is to provide a hopper for dehumidifying loose particulate material which allows to reduce the maintenance times of the entire system in which it is inserted.

This aim and these and other objects, which will become better apparent hereinafter, are achieved by a hopper for dehumidifying loose particulate material, of the type constituted by a container for the particulate material, which is provided, in an upper region, with a covering provided with a manifold for loading the hopper, the outlet of a duct being provided on the bottom region of said container, said duct being functionally associable with the delivery of an air dehumidification device, an area for venting the air that is present in said container being provided on said covering and being functionally associable with the intake of the air dehumidification device, said hopper being characterized in that it comprises air filtering means which are arranged substantially at said venting area.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
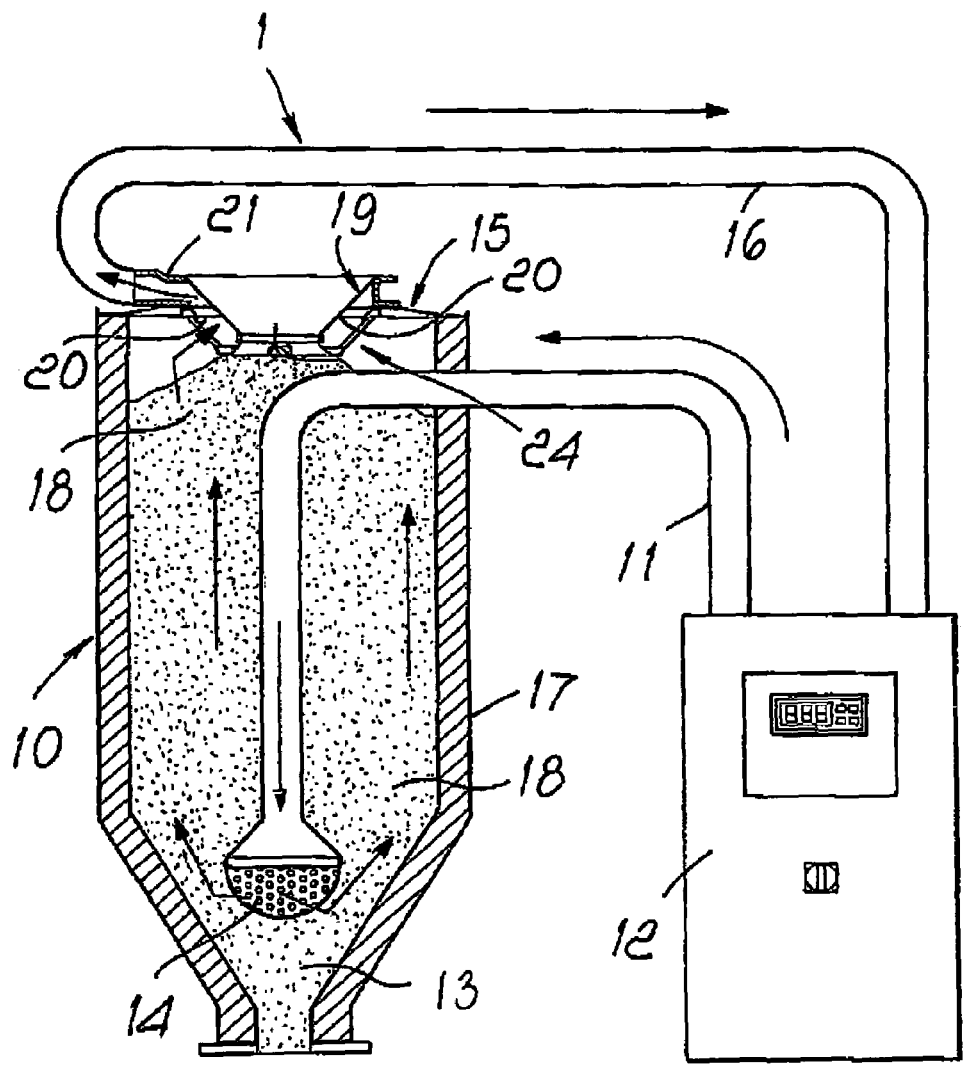
FIG. 1 is a partially sectional schematic view of a system for dehumidifying particulate material provided with a hopper according to the invention.

With reference to the figures, a hopper for dehumidifying granules of plastic material, according to the invention, is generally designated by the reference numeral 10.

The hopper 10 is inserted in a dehumidification system, generally designated by the reference numeral 1.

The dehumidification system 1 substantially comprises an air dehumidification device 12, of a per se known type, which is provided with a delivery duct 11, the outlet 14 of which is inserted within the hopper 10.

A duct 16 for input to the air dehumidification device 12 extends from a covering 15 of the hopper 10.

The hopper 10 is constituted by a container 17 for the granules of plastic material (which are designated by the reference numeral 18), which is provided, in an upper region, with the covering 15, from which the intake duct 16 extends.

The covering 15 is provided with a manifold 19 for loading the hopper 10, which is open toward the inside of the container 17; the manifold 19 is of the type which tapers downward, and in particular, in this embodiment, is frustum-shaped.

On the covering 15 there is an area 20 for venting the air that is present in the container 17, which is described in greater detail hereinafter and is functionally connected to the intake duct 16.

The outlet 14 of the delivery duct 11 of the air dehumidification device 12 is provided on a bottom region 13 of the container 17 and is constituted for example by a hemispherical diffuser element provided with a grille.

The covering 15 comprises an annular volute 21, the access of which is constituted by the venting area 20.

The venting area is annular, lies around the manifold 19, and is delimited by an inner rim 22a and an outer rim 22b.

In particular, in this embodiment the venting area 20 is delimited, on its inner rim 22a, by the sides of the manifold 19, which as mentioned is frustum-shaped in this embodiment.

The annular volute 21 is provided with a delivery port 23, which is connected to the intake duct 16.

Advantageously, the hopper 10 is provided with air filtering means 24, which are arranged substantially at the venting area 20.

The air filtering means 24 are constituted for example by a filtering body 25, which surrounds the manifold 19 and has an annular filtering surface 26, which overlaps the venting area 20.

In particular, the filtering body 25 comprises an annular filtering element 27, which is frustum-shaped in this embodiment and forms the annular filtering surface 26.

Accordingly, the annular filtering surface 26 also is frustum-shaped.

The upper edge 28 of the annular filtering element 27 is arranged at the outer rim 22b of the venting area 20, while the lower edge 30 is integrated on a collar 31 for connection to the end portion 32 of the manifold 19.

In particular, the upper edge 28 of the annular filtering element 27 is fixed on a first ring 33 and the lower edge 30 is fixed on a second ring 34, which is integrated in the collar 31.

Sealing means 35 are provided between the annular filtering element 27 and the outer rim 22b of the venting area 20 and between the collar 31 and the manifold 19, and are constituted respectively by an upper gasket 36, which is accommodated on the first ring 33, and a lower gasket 37, which is described hereinafter.

The collar 31 is constituted by the second ring 34, from which a frustum-shaped portion 38 protrudes and tapers upward up to a cylindrical portion 39.

The end part 32 of the manifold 19 is also cylindrical and has a smaller diameter than the cylindrical portion 39 of the collar 31.

The lower gasket 37 is fitted on the upper end of the cylindrical portion 39 and substantially has a U-shaped cross-section.

The lower gasket 37 abuts against the inclined side of the manifold 19.

The filtering body 25 in practice is a component which can be separated with respect to the manifold 19.

The filtering body 25 is in fact provided with means 40 for reversible fastening to the manifold 19, which are constituted by at least two wirelike hooks, which are contoured so that each one has a first substantially C-shaped portion 41, a second straight portion 42 for insertion in pivoting plates 43 fixed to the frustum-shaped portion 38 of the collar 31, and a third elongated portion 44, which is inclined with respect to the second straight portion 42 and is intended to be arranged on a corresponding locking seat 45, provided for example by a lamina which is welded at one end and forms a C-shaped receptacle which is open substantially radially toward the inside of the collar 31.

The locking seat 45 is formed inside the second ring 34.

The third elongated portion 44 is provided to operate the hook.

The filtering body 25 is fixed as follows.

The filtering body 25 is arranged so that the cylindrical portion 39 of the collar 31 surrounds the end part 32 of the manifold 19 and the lower gasket 37 abuts against the inclined side of the manifold 19.

Accordingly, the upper gasket 36 is arranged in abutment against the covering 15, at the outer rim 22b of the venting area 20.

At this point, by gripping the third elongated portion 44 of the hooks, such hooks are turned until the first substantially C-shaped portions 41 press against the inclined sides of the manifold 19.

The third elongated portions 44 protrude with respect to the second ring 34; by flexing them slightly, they are arranged inside the locking seats 45 and remain locked.

Figure 2:
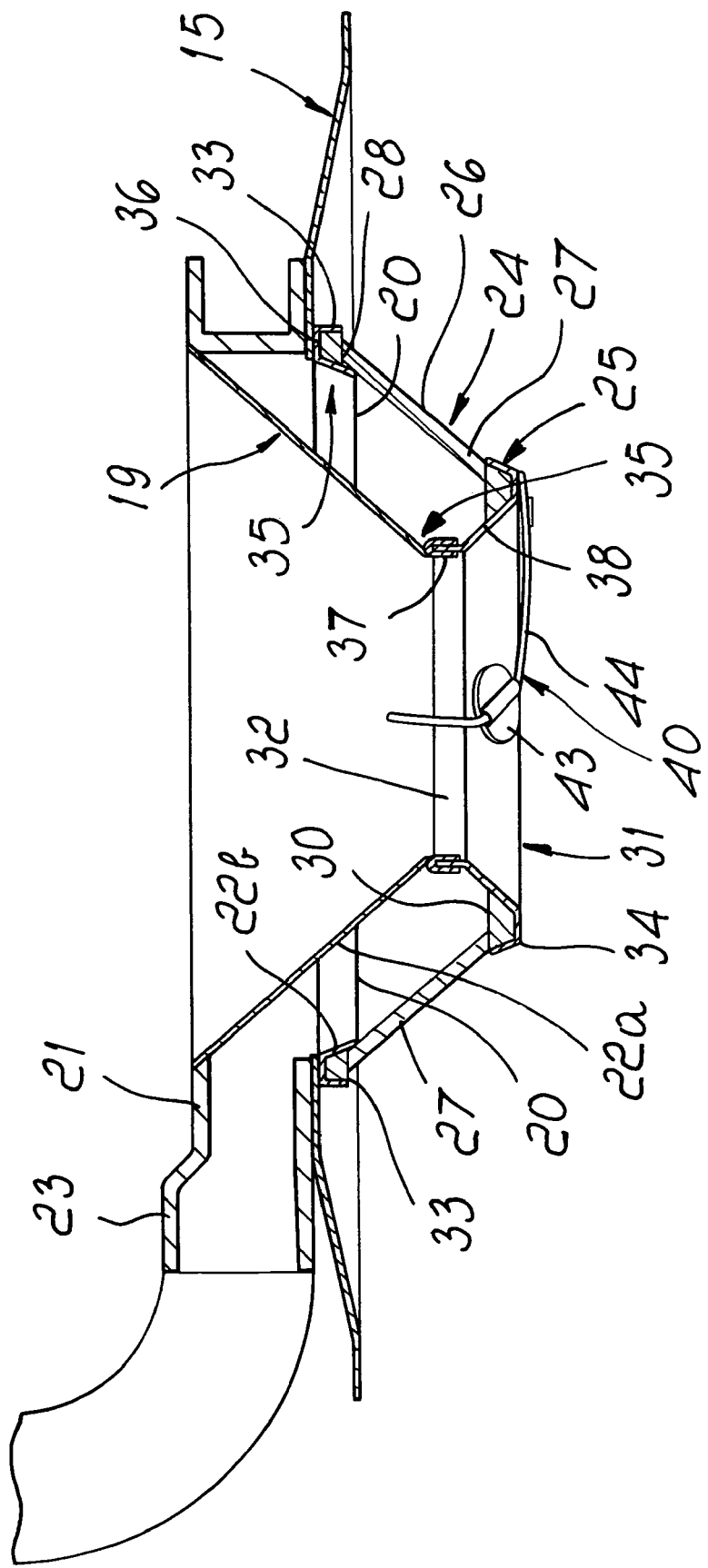
FIG. 2 is a partially sectional schematic view of a detail of a hopper according to the invention.
Figure 3:
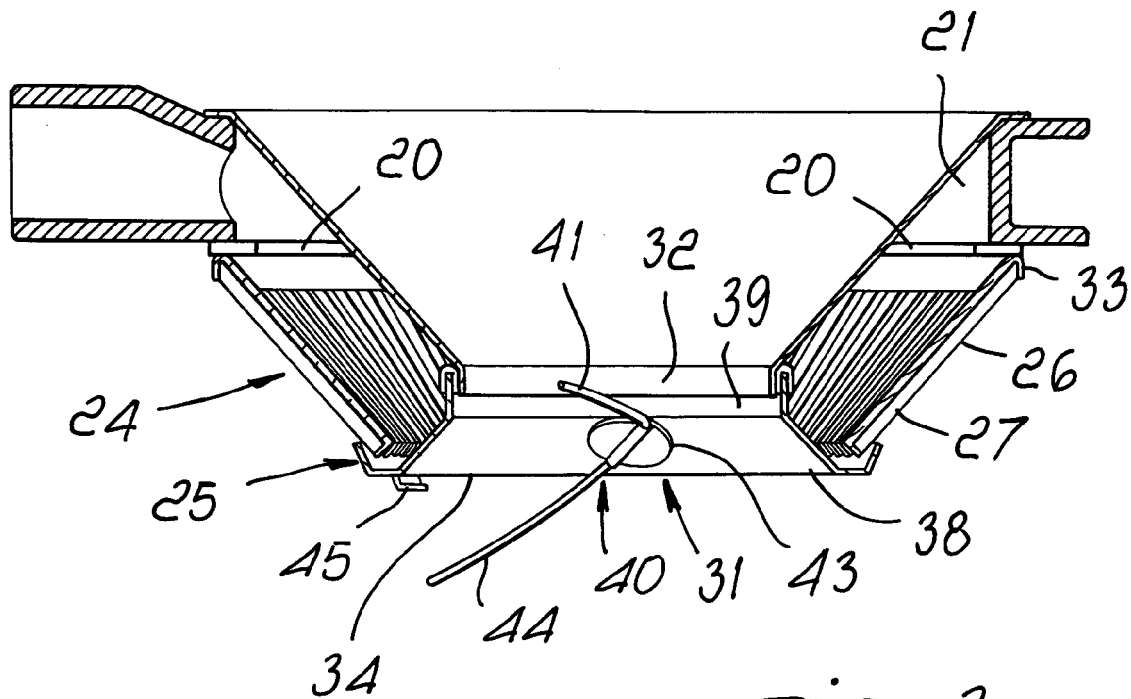
FIG. 3 is another partially sectional schematic view of the same detail of the hopper of FIG. 2.
Figure 4:
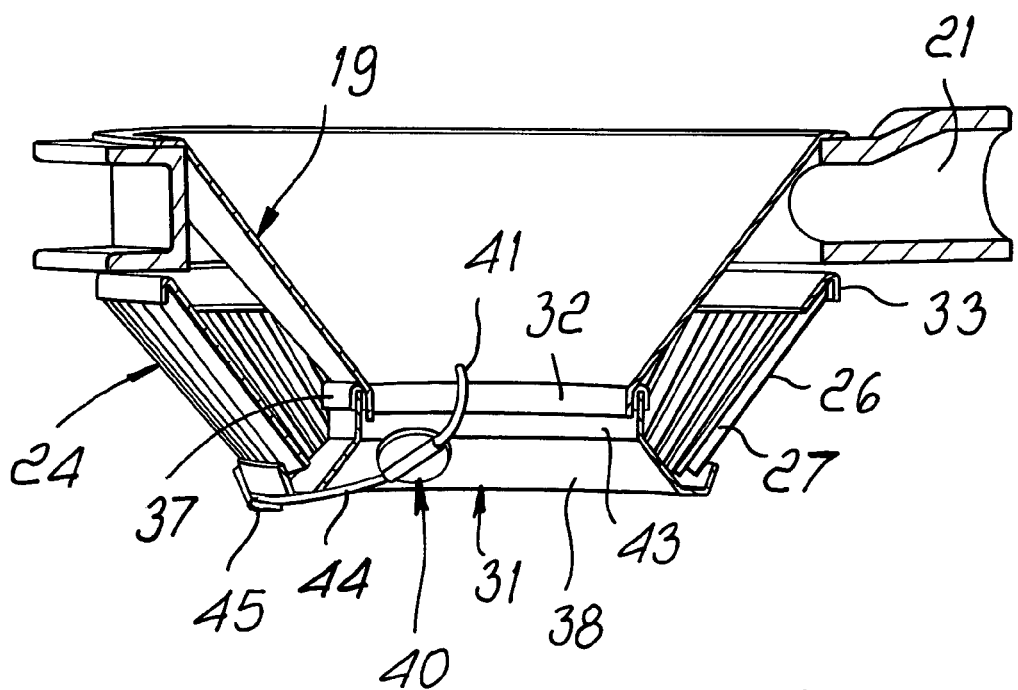
FIG. 4 is a partially sectional perspective view of the same detail of the hopper of FIG. 3.
Figure 5:
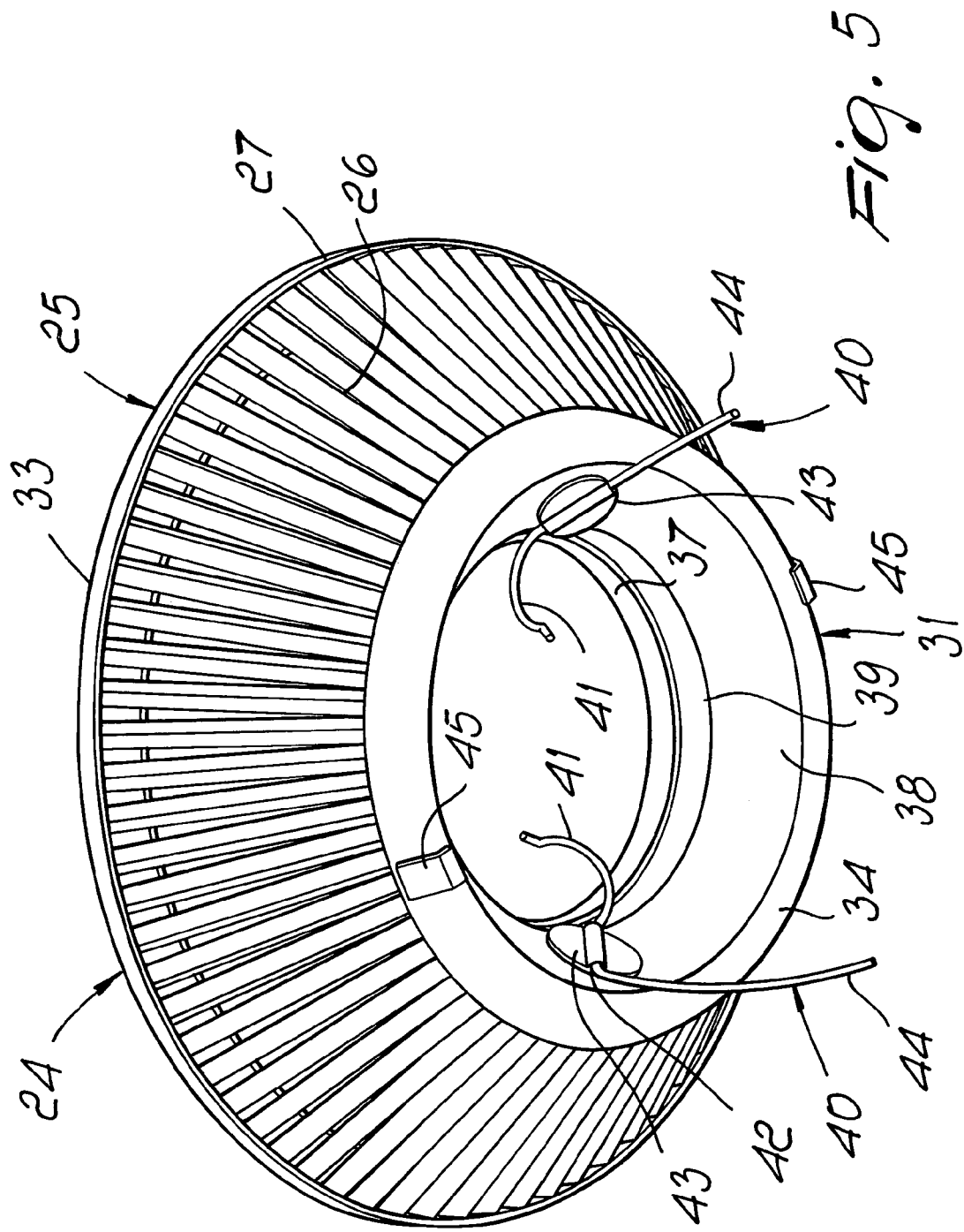
FIG. 5 is a perspective view of the filtering body which provides an embodiment of hopper filtering means according to the invention, illustrating hooks for fixing to the manifold of the hopper in the open position.
Figure 6:
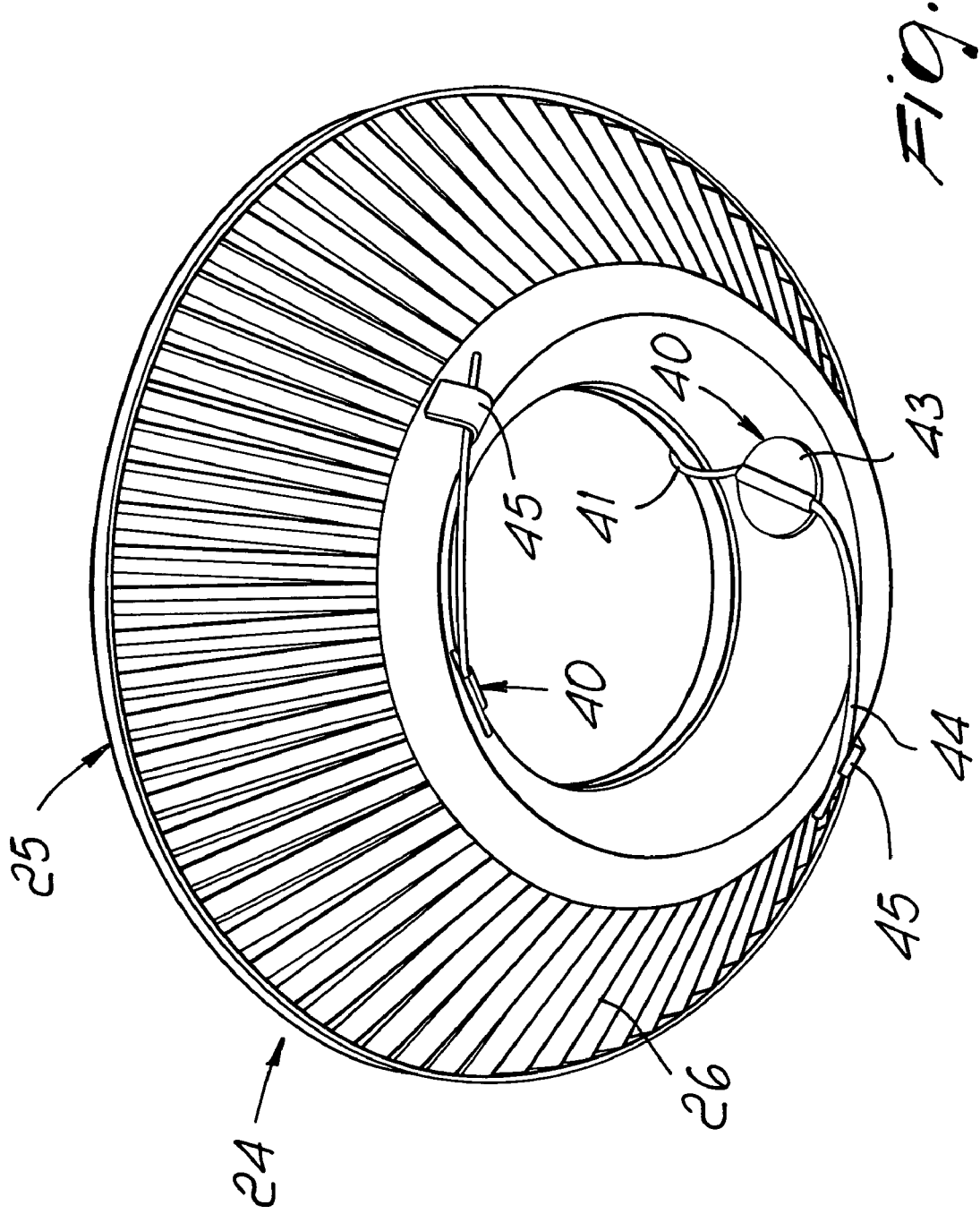
FIG. 6 is a perspective view of the filtering body of FIG. 5, with the hooks for fixing to the manifold of the hopper in the closed position.

FIGS. 3 and 5 show the hooks in the open position, while FIGS. 2, 4 and 6 illustrate the hooks in the closed position.

Once the filtering body 25 has been installed in the hopper 10, the operation of the system is shown in FIG. 1.

The dehumidification device 12 pumps the hot dry air by means of the delivery duct 11 at the bottom region 13 of the hopper 10, in which the material to be dehumidified is contained.

The air flows upward through the entire hopper from the lower region, where the diffuser element of the outlet 14 of the delivery duct 11 is located, and removes the humidity and the unavoidable dust which the particulate material contains, until it reaches the upper part of the hopper.

The level of the material reaches substantially the frustum-shaped loading manifold 19 installed in the covering 15.

The volute 21 which collects the venting air is integrated in the covering.

The conical side of the manifold forms the internal wall of the volute.

The filtering means 24 are arranged in input to the volute at the venting area 20.

The level of the hopper is traditionally kept rather low with respect to the volute in order to prevent granules from being aspirated into the manifold.

By instead using a hopper according to the invention, it is possible to keep the level of the particulate material even in contact with the filtering means 24, which are adjacent to the venting area 20.

In this configuration, the granules and dust in fact cannot be aspirated by means of the venting area 20, since said area is protected by the filtering surface 26.

Even if the granules and dust were to make contact with the filtering surface 26, the position and frustum-shaped configuration of said surface would prevent them from clinging and accumulating.

By using an external traditional filter instead, if granules are aspirated from the venting area, they stop in the container of the filter downstream of the hopper, accumulating until the subsequent cleaning operation.

If many granules are aspirated, the filter and the return duct would be clogged up, compromising the functionality of the system.

The hopper according to the invention therefore increases the reliability and efficiency of the dehumidification system.

By installing the filtering means inside the hopper, the advantage is also achieved of being able to connect directly the volute 21 to the dryer by means of a single intake duct, thus avoiding the interposition of an external filter, with the associated complications and expenses.

Since the hopper is opened rather frequently in order to check the material contained therein, by installing the filtering means inside the hopper, and particularly in the covering, every time the hopper is opened the operator unintentionally inspects the filter.

In this manner, the efficiency over time of the filtering means is ensured, whereas by using an external filter inspection and cleaning are performed less frequently.

The frustum-like shape of the filtering surface 26 is preferential with respect to other shapes because it allows easily to provide filtering means which connect easily to the frustum-shaped manifold and to the covering.

The annular shape of the filtering body and of the filtering surface is needed in order to avoid obstructing the loading manifold.

In practice it has been found that the invention thus described solves the problems noted in known types of dehumidification system for particulate material; in particular, the present invention provides a hopper for dehumidifying loose particulate material which is useful particularly but not exclusively for granules of plastic material, allows to reduce maintenance of the system in which it is inserted, and simplifies the system, reducing both the implementation costs of said system and the maintenance costs.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to the requirements and the state of the art.

The disclosures in Italian Patent Application No. PD2004A000258 from which this application claims priority are incorporated herein by reference.

What is claimed is:

1. A hopper for dehumidifying loose particulate material, comprising: a container far the particulate material, which is provided, in an upper region, with a covering provided with a manifold for loading the hopper; a duct having an outlet provided on a bottom region of said container, said duct being functionally associable with a delivery of an air dehumidification device; an area for venting air that is present in said container, which is annular, lies around said manifold and is provided on said covering; air filtering means for filtering the venting air that comprise a filtering body provided with an annular filtering element which surrounds said manifold and is provided with an annular filtering surface that overlaps the venting area so as to prevent dust and particles present in the venting air from being aspirated through said venting area; and an annular volute suitable to collect the venting air from the container and which is integrated in said covering so as to surround said manifold, said annular volute having an air access constituted by the venting area whereby to connect said venting area to an intake of the air dehumidification device.

2. The hopper of claim 1, wherein said annular filtering surface tapers downward.

3. The hopper of claim 2, wherein said annular filtering surface is frustum-shaped.

4. The hopper of claim 1, wherein said venting area is delimited, on an inner rim thereof, by sides of said manifold.

5. The hopper of claim 4, wherein said annular filtering element, tapers downward and has an upper edge arranged at an outer rim of said venting area and a lower edge integrated on a collar for connection to an end part of said manifold.

6. The hopper of claim 5, wherein said manifold and said annular filtering element are frustum-shaped, sealing means being provided between said annular filtering element and said outer rim of said venting area and between said collar and said manifold, said filtering body being rigidly coupled to said manifold by virtue of reversible engagement means.

7. The hopper of claim 6, wherein the upper edge of said annular filtering element is fixed to a first ring, while the lower edge is fixed on a second ring integrated in said collar, said collar being constituted by said second ring, from which a frustum-shaped portion protrudes and tapers upward up to a cylindrical portion, the end part of said manifold being also cylindrical and having a smaller diameter than said cylindrical portion, said sealing means being constituted respectively by an upper gasket, which is accommodated on said first ring, and a lower gasket, which substantially has a U-shaped cross-section and is fitted on the upper end of said cylindrical portion.

8. The hopper of claim 7, wherein said reversible engagement means are constituted by at least two wire hooks, which are contoured so that each one has a first substantially C-shaped portion, a second straight portion for insertion in pivoting plates fixed to said frustum-shaped portion of said collar, and a third elongated portion, which is inclined with respect to said second straight portion, to be arranged on a corresponding locking seat.

9. The hopper of claim 8, wherein said locking seat is formed by a lamina, which is welded at one end to said second ring, forming a C-shaped receptacle which is open substantially radially toward the inside of said collar.

10. A dehumidification system for loose particulate material, comprising a dehumidification device which is connected at a delivery and at an intake to a hopper for dehumidifying loose particulate material, comprising: a container for the particulate material, which is provided, in an upper region, with a covering provided with a manifold for loading the hopper; a duct having an outlet provided an a bottom region of said container, said duct being functionally associable with a delivery of the air dehumidification device; an area for venting air that is present in said container which lies around said manifold and is provided on said covering; air filtering means for filtering the venting air that comprise a filtering body provided with an annular filtering element which surrounds said manifold and is provided with an annular filtering surface that overlaps the venting area so as to prevent dust and particles present in the venting air from being aspirated through said venting area; and an annular volute suitable to collect the venting air from the container and which is integrated in said covering so as to surround said manifold, said annular volute having an air access constituted by the venting area whereby to connect said venting area to an intake of the air dehumidification device.

11. A covering detachably connectable to a container of a hoppers for dehumidifying loose particulate material, comprising: a central manifold for loading the hopper; an annular volute suitable to collect venting air from the container and which is integrated in the covering so as to surround said manifold, said annular volute having an access which is constituted by an annular venting area and connecting said venting area to an intake of an air dehumidification device for venting air present in the container, said venting area being delimited, on its inner rim, by sides of said manifold; filtering means for filtering the venting air that comprise a filtering body provided with an annular filtering element which surrounds said manifold and is provided with an annular filtering surface that tapers downwardly and overlaps the venting area so as to prevent dust and particles present in the venting air from being aspirated through said venting area.

12. A hopper for dehumidifying loose particulate material, comprising a container for the particulate material, which is provided, in an upper region, with a covering provided with a manifold for loading the hopper, an outlet of a duct being provided on a bottom region of said container, said duct being functionally associable with a delivery of an air dehumidification device, an area for venting air that is present in said container being provided on said covering and being functionally associable with an intake of the air dehumidification device, said hopper further comprising air filtering means which are arranged substantially at said venting area, wherein said covering comprises an annular volute, the access of which is constituted by said venting area, said venting area being annular and being delimited, on an inner rim thereof, by sides of said manifold, and wherein said filtering body comprises an annular filtering element, which tapers downward and has an upper edge arranged at an outer rim of said venting area and a lower edge integrated on a collar for connection to an end part of said manifold.

13. The hopper of claim 12, wherein said venting area lies around said manifold, said air filtering means comprising a filtering body which surrounds said manifold, said filtering body being provided with an annular filtering surface which overlaps said venting area.

14. The hopper of claim 12, wherein said annular filtering surface is frustum-shaped.

15. The hopper of claim 12, wherein said manifold and said annular filtering element are frustum-shaped, sealing means being provided between said annular filtering element and said outer rim of said venting area and between said collar and said manifold, said filtering body being rigidly coupled to said manifold by virtue of reversible engagement means.

16. The hopper of claim 15, wherein an upper edge of said annular filtering element is fixed to a first ring, while the lower edge is fixed on a second ring integrated in said collar, said collar being constituted by said second ring, from which a frustum-shaped portion protrudes and tapers upward up to a cylindrical portion, the end part of said manifold being also cylindrical and having a smaller diameter than said cylindrical portion, said sealing means being constituted respectively by an upper gasket, which is accommodated on said first ring, and a lower gasket, which substantially has a U-shaped cross-section and is fitted on the upper end of said cylindrical portion.

17. The hopper of claim 16, wherein said reversible engagement means are constituted by at least two wire hooks, which are contoured so that each one has a first substantially C-shaped portion, a second straight portion for insertion in pivoting plates fixed to said frustum-shaped portion of said collar, and a third elongated portion, which is inclined with respect to said second straight portion, to be arranged on a corresponding locking seat.

18. The hopper of claim 17, wherein said locking seat is formed by a lamina, which is welded at one end to said second ring, forming a C-shaped receptacle which is open substantially radially toward the inside of said collar.

* * * * *